United States Patent [19]
Datis

[11] 3,972,201
[45] Aug. 3, 1976

[54] VAPOR RECOVERY SYSTEM

[75] Inventor: Angelo P. Datis, Los Angeles, Calif.

[73] Assignee: Process Products, Inc., Gardena, Calif.

[22] Filed: Jan. 29, 1975

[21] Appl. No.: 545,043

[52] U.S. Cl. ........................................ 62/54; 55/58; 55/88; 55/89; 55/179; 62/48; 220/85 VR
[51] Int. Cl.[2] ......................................... F17C 7/02
[58] Field of Search .................. 62/54/48; 55/58, 62, 55/88, 89, 179; 220/85 VR, 85 VS

[56] References Cited
UNITED STATES PATENTS

| | | |
|---|---|---|
| 2,765,872 | 10/1956 | Hartman et al. ........................ 55/88 |
| 2,849,150 | 8/1958 | Tompkins, Jr. ................. 220/85 VR |
| 3,266,262 | 8/1966 | Moragne ................................. 62/54 |
| 3,369,371 | 2/1968 | Holly et al. ............................. 62/54 |
| 3,714,790 | 2/1973 | Battey ..................................... 62/54 |

*Primary Examiner*—William E. Wayner
*Assistant Examiner*—Ronald C. Capossela
*Attorney, Agent, or Firm*—Lyon & Lyon

[57] ABSTRACT

A method and apparatus for recovering vapors from at least one receiving tank into which a volatile liquid is introduced consisting of conduit means for conveying vapors from the tank, refrigeration means, pumping means connected to the conduit means for conveying vapors from the tank and having an outlet connected to the refrigeration means, a vapor recirculation conduit from the refrigeration means outlet to the pumping means inlet, a liquid drain conduit from the refrigeration means, at least one canister containing filtering media and having an inlet and outlet, the canister inlet being connected to the recirculation conduit, the canister outlet being in communication with the atmosphere, the canister being further provided with inlet valving and outlet valving allowing for the isolation of the canister inlet from the recirculation conduit and the outlet to the atmosphere, and a vacuum means having an inlet in communication with the canister and having an outlet in communication with the refrigeration means liquid drain.

13 Claims, 1 Drawing Figure

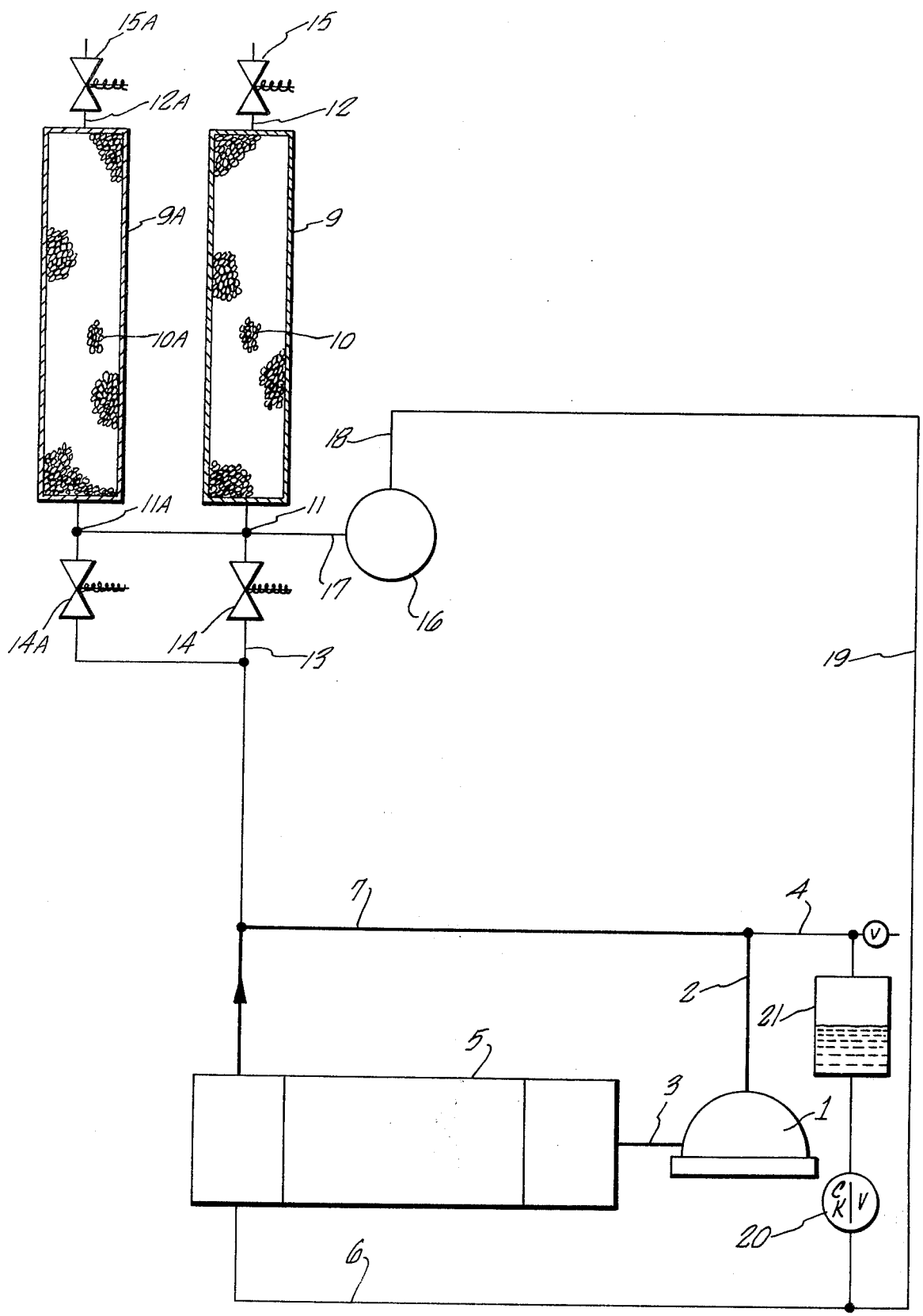

VAPOR RECOVERY SYSTEM

BACKGROUND OF THE INVENTION

1. Field of the Invention

The present invention pertains to a vapor recovery system. More particularly, the present invention pertains to a system for the recovery of vapors from volatile liquids.

2. Description of the Prior Art

Motor vehicles are generally provided with liquid fuel at service stations equipped to pump such fuel from a fuel storage supply to a fuel tank located within the vehicle. The fuel is generally passed through a fuel pump to a hose which terminates in a liquid dispensing nozzle. The nozzle dispensing outlet is connected to or inserted into the vehicle fuel tank inlet, and the pump and nozzle are actuated in order to cause delivery of fuel from the service station storage to the vehicle fuel tank.

Most fuel nozzles in use include means for maintaining the nozzle in a fuel-delivery condition without the necessity of an attendant holding the nozzle in such condition. Such automatic nozzles include means to cut off the flow of fuel therefrom when the vehicle fuel tank has reached its full condition. The fuel passes through a fuel filler pipe on the vehicle tank in passing from the nozzle to the vehicle fuel tank. Such fuel is normally supplied at a rate in the order of two to fifteen gallons per minute. As a consequence, considerable agitation of the fuel may take place as the fuel is received in the vehicle fuel tank.

This agitation frequently results in a splash-back of fuel through the fuel filler pipe of the vehicle. The splash-back is often so great that fuel spills onto the ground and onto person in the vicinity of the vehicle. The splash-back is particularly heavy when the fuel tank has reached its full condition and an automatic nozzle is caused to cut off. The fuel spilling on the ground creates a hazardous and undesirable condition. Not only does it present a danger of fire but also its evaporation results in pollution of the air.

In addition, and even more importantly, as fuel is being supplied to a vehicle, fuel vapor escapes from the vehicle fuel tank filler pipe, and this vapor adds to the air pollution. Air pollution is increasingly becoming a cause of concern. Hydrocarbon vapors represent a major contribution to air pollution and form photochemical smog. Such polluted air is an irritant to human respiratory and lachrymal systems. While the reduction of the fuel delivery rate helps to reduce the escape of liquid fuel caused by splash-back, it does not prevent escape of fuel vapors and, in fact, because of the longer time required to fill the vehicle fuel tank, the reduction of the delivery rate may increase the escape of fuel vapors during the filling of the tank.

In an attempt to reduce the pollution problems caused by the release of hydrocarbon vapors to the atmosphere, various refrigeration and other systems have been developed for the recovery of such vapors. However, such systems are extremely expensive. In order to prevent any release of hydrocarbon vapors to the atmosphere, such systems must cool the vapors to temperatures low enough to condense all the vapors. Even at such low temperatures all of the hydrocarbon vapors may not be condensed due to a failure of the vapors to adequately contact the refrigeration cooling means such as cooling fins, etc. An additional problem unsolved by such systems is the removal of noncondensables such as air from the system, while assuring that no hydrocarbon material will escape. The purpose of this invention is to provide an improved vapor recovery system.

SUMMARY OF THE INVENTION

The present invention deals with a method and apparatus for recovering vapors from a receiving tank into which a volatile liquid is being introduced. According to the present invention, vapors are removed from a liquid receiving tank by means of a pump which transfers the vapors to a refrigeration unit where the vapors are cooled to a temperature sufficient to allow for the condensation of a large amount of the vapor material. The condensed liquid is then allowed to return to a liquid storage tank, and a portion of vapor which is not condensed is recirculated back to the pump suction. Periodically the system is vented to the atmosphere through a canister having a filtering media such as activated carbon which insures that substantially no hydrocarbon vapor will be released to the atmosphere with its attendant air pollution consequences. The canister is connected to the recirculation conduit by an inlet valve and is further provided with an outlet valve which opens to the atmosphere. At the conclusion of the venting operation, the canister inlet and outlet valves are closed and a vacuum pump is used to remove hydrocarbon vapors filtered out by the filtering media. The hydrocarbon material removed by the filtering media is discharged by the vacuum pump into the liquid drain line which returns to a liquid storage tank. For the larger applications a plurality of such venting canisters may be required.

The principal advantage of such a system is that it prevents the release of hydrocarbon material to the atmosphere without requiring that all of the vapors be converted to a liquid. This is accomplished by means of the recirculation conduit and the venting canisters previously described. Such a system insures that non-condensed vapors other than fuel may be vented to the atmosphere while insuring that hydrocarbons will be retained within the system.

The preceeding description referred to the problems present in the handling of volatile liquid hydrocarbon fuels, and the application of the present device to such problems. However, it is to be understood that such a nozzle may be utilized in conjunction with any volatile liquid whose vapors are desired to be recovered such as acids, toxic liquids, etc.

BRIEF DESCRIPTION OF THE DRAWINGS

The FIGURE is a schematic diagram of a vapor recovery system of the present invention.

DESCRIPTION OF THE PREFERRED EMBODIMENTS

A pumping means 1 having an inlet 2 and an outlet 3 is used to remove vapors from a storage tank 21 or a vehicle fuel tank (not shown) through a vapor conveying conduit 4. The pump discharge 3 is connected to a refrigeration unit 5 wherein the vapors are reduced in temperature sufficient to allow for the condensation of the vapors. Liquids thus formed are removed by means of a liquid drain conduit 6. Noncondensed vapors exit the refrigeration unit 5 into a vapor recirculation conduit 7 which is connected to the pump inlet 2. A canister 9 is provided with a filtering media, such as activated carbon, 10 therein, the canister having an inlet 11 and an outlet 12. The canister inlet 11 is connected to the vapor recirculation conduit 7 by means of vent conduit 13. Vent conduit 13 and canister inlet 11 are separated by canister inlet valving 14. Similarly, canister outlet 12 may be isolated from the atmosphere by closing canister outlet valving 15. A vacuum pump 16 is connected to the canister inlet 11 by means of vacuum inlet conduit 17. The vacuum pump 16 outlet 18 is connected to the liquid drain 6 by means of a return conduit 19. The drain conduit 6 may be connected to a fuel storage tank 21. A check valve 20 may be provided in the liquid drain conduit 6, thus preventing liquid flow from the tank 21 to the refrigeration means 5, and the vacuum pump 16.

Having described each of the components of the vapor recovery system, the operation of the system will now be discussed. Upon application of pumping means 1, hydrocarbon vapors are drawn through the vapor conduit 4 into the pump inlet 2 and are discharged by the pump 1 through the pump outlet 3 into a refrigeration unit 5 wherein most of the liquid hydrocarbon is condensed and exits the refrigeration unit 5 through the liquid drain conduit 6. In a preferred embodiment at least 70% of the vapors are recovered by means of condensation in a refrigeration unit. Those gases which are not condensed leave the refrigeration unit 5 by means of a vapor recirculation conduit 7 which is connected to the pump inlet 2. Such recirculation of uncondensed vapors results in a substantial advantage for the vapor recovery system. Recirculation of the uncondensed vapors about recirculation conduit 7 insures adequate contact of the vapors to be recovered with the refrigerant exchange surface such as cooling fins or tubes of the refrigeration unit 5. Due to the increased efficiency of the refrigeration unit 5, produced by the recirculation conduit 7, the refrigeration unit may remove a larger amount of vapors than "once through" refrigeration units operating at the same temperature. Moreover, because the cooled uncondensed vapors are immediately returned to the pump suction 2, they provide an "economizer" effect by lowering the temperature of the uncooled vapors entering the pump suction 2 through inlet conduit 4, prior to such vapors entry into the refrigeration unit 5.

After the refrigeration unit 5 and pumping means 1 have been in operation for a predetermined period of time, or alternately, after the pressure in the vapor conduit 4 or the fuel storage tank 21 increases to a predetermined level, canister inlet valving means 14 is opened thereby allowing noncondensed vapors to pass through the activated carbon 10 in the canister 9. A vapor pressure increase in the fuel tank 21 and the connected vapor conduit 4 is produced when large amounts of vapors are generated, as when the fuel storage tank is being filled at high rate by a tank truck. Canister outlet valving 15 is opened prior to the opening of inlet valving 14 thus releasing the vacuum in the canister. This release of the vacuum in the canister 9 aids in preventing channeling in the filtering media in the canister 9. The activated carbon 10 removes the hydrocarbon material from such vapor and allows the nonhydrocarbon gas to exit the canister 9 through a canister outlet 12 and the canister outlet valve 15.

For larger installations a multiplicity of such canisters may be employed sequentially. Illustrative of such a series is canister 9A filled with activated carbon material 10A and having a canister inlet 11A, a canister outlet 12A, a canister outlet valving 15A and a canister inlet valving 14A.

Upon the completion of the venting stage, when the filtering media activity has decreased to a predetermined level due to the removal of hydrocarbon material, valving means 14 and 15 are closed, and the vacuum pump 16 is energized. The vacuum pump 16 pulls hydrocarbons removed by the filtering media 10 through vacuum inlet conduit 17, and discharges such hydrocarbons into the liquid drain conduit 6 by means of a return conduit 19. The provision of a series of canisters such as canister 9 and 9A allows for the continuous venting of the system, as might be required during peak loading. Such peak loading typically occurs when a fuel tank truck is filling a station storage tank, and the vapors from such storage tank are being recovered in addition to the vapors from vehicle fuel tanks which are being filled. When a second canister 9A is provided, the second canister 9A may be adapted so as to initiate venting simultaneously with the change from vent stage to vacuum stage of the first canister 9. When the venting stage of the second canister 9A has reached the point at which the vacuum stripping of canister 9A is required, the vacuum stripping of canister 9 has been completed, and the canister 9 initiates the venting of the system simultaneous with the beginning of the vacuum stripping of canister 9A. Thus the provision of more than one canister allows for the continuous venting of the system if such continuous operation is required such as during peak load conditions.

While this invention has been described in conjunction with preferred embodiments thereof, it is obvious that many modifications and changes therein can be made by those skilled in the art without departing from the spirit and scope of this invention as described by the claims appended hereto.

I claim:

1. An apparatus for recovering vapors from at least one receiving tank into which a volatile liquid is introduced comprising:
   conduit means connected to a tank for conveying vapors from a tank;
   refrigeration means having an inlet and an outlet;
   pumping means having an inlet connected to said conduit means for conveying vapors from a tank and having an outlet connected to said refrigeration means inlet;
   a vapor recirculation conduit from said refrigeration means outlet to said pumping means inlet; and
   a liquid drain conduit from said refrigeration means.

2. The apparatus claimed in claim 1 wherein said apparatus further comprises extraction and condensation means connected to said recirculation conduit for extracting and condensing a portion of the vapors that remain uncondensed by said refrigeration means.

3. The apparatus claimed in claim 2 wherein said extraction and condensation means is further described as comprising:
   at least one canister containing filtering media and having an inlet and outlet, said canister inlet being connected to said recirculation conduit, and said canister outlet being in communication with the atmosphere, said canister being further provided with inlet valving and outlet valving allowing for the isolation of said canister inlet from said recirculation conduit and said outlet to the atmosphere respectively; and said extraction and condensation means is further provided with:

a vacuum means having an inlet in communication with said canister and having an outlet in communication with said refrigeration means liquid drain conduit.

4. The apparatus claimed in claim 1 wherein said liquid drain conduit connects said refrigeration means and a liquid storage tank.

5. The apparatus claimed in claim 4 wherein a check valve is employed in said liquid drain conduit thereby permitting flow from said refrigeration means to said liquid storage tank and preventing flow from said liquid storage tank to said refrigeration means.

6. The apparatus claimed in claim 1 wherein two canisters containing filtering media are provided, each of said canisters having an inlet and an outlet, said canister inlets being connected to said recirculation conduit, and said canister outlet being in communication with the atmosphere.

7. An apparatus for recovering hydrocarbon fuel vapors from at least one fuel receiving tank into which a volatile hydrocarbon liquid fuel is introduced comprising:
   conduit means for conveying hydrocarbon vapors from a tank;
   refrigeration means having an inlet and an outlet;
   pumping means having an inlet connected to said conduit means for conveying hydrocarbon vapors from a tank and having an outlet connected to said refrigeration means inlet;
   a vapor recirculation conduit from said refrigeration means outlet to said pumping means inlet;
   a liquid drain conduit from said refrigeration means to a liquid hydrocarbon storage tank;
   at least one canister containing activated carbon and having an inlet and outlet, said canister inlet being connected to said recirculation conduit, and said canister outlet being further provided with inlet valving and outlet valving allowing for the isolation of said canister inlet from said recirculation conduit and said outlet to the atmosphere;
   a vacuum means having an inlet in communication with said canister and having an outlet in communication with said refrigeration means liquid drain conduit.

8. A method of recovering vapors from a receiving tank concurrent with the introducing of a volatile liquid into a receiving tank comprising:
   conveying said vapors from said receiving tank by means of a pumping means;
   cooling said vapors by means of a refrigeration means to a temperature sufficient to condense most of said vapors to a liquid state;
   recirculating through said pumping means, said refrigeration means and a recirculation conduit that portion of said vapors which are not converted to a liquid state;
   draining the refrigerated liquid to a storage tank;
   venting said unconverted vapors through a filtering media;
   stripping those vapors filtered by said filtering media; and
   conveying said stripped vapors to said storage tank.

9. The method claimed in claim 8 wherein said filtering media is contained within at least one canister having an inlet and outlet, said canister inlet being connected to said recirculation conduit, and said canister outlet being in communication with the atmosphere, said canister being further provided with inlet valving and outlet valving allowing for the isolation of said canister inlet from said recirculation conduit and said outlet to the atmosphere.

10. The method claimed in claim 9 wherein said outlet valving is opened prior to said inlet valving.

11. The method claimed in claim 9 wherein said canister inlet valving is opened upon the producing of a predetermined pressure in said receiving tank.

12. The method claimed in claim 9 wherein there are at least two canisters, said canisters operating sequentially.

13. A method of hydrocarbon recovering vapors from a receiving tank concurrent with the introducing of a volatile liquid hydrocarbon fuel into a fuel receiving tank comprising:
   conveying said hydrocarbon vapors from said tank by means of a pumping means;
   cooling said hydrocarbon vapors by means of a refrigeration means to a temperature sufficient to substantially convert said hydrocarbon vapors to a liquid state;
   recirculating through said pumping means, said refrigeration means and a recirculation conduit that portion of said hydrocarbon vapors which are not converted to a liquid state;
   draining the refrigerated hydrocarbon liquid to a fuel storage tank;
   venting said unconverted hydrocarbon vapors through an activated carbon filtering media;
   stripping said vapors filtered by said activated carbon, said venting and stripping being accomplished by sequencing the operation of at least two canisters of activated carbon filtering media, whereby one of said canisters begins venting when the other is required to undergo stripping; and
   conveying said stripped vapors to said storage tank.

* * * * *